April 14, 1959    R. K. HODKIN    2,881,625
CONTROL APPARATUS FOR VARIABLE RATIO POWER TRANSMISSION MEANS
Filed July 11, 1957    3 Sheets-Sheet 2

RICHARD KEITH HODKIN
INVENTOR
by Irvin S. Thompson
ATTORNEY

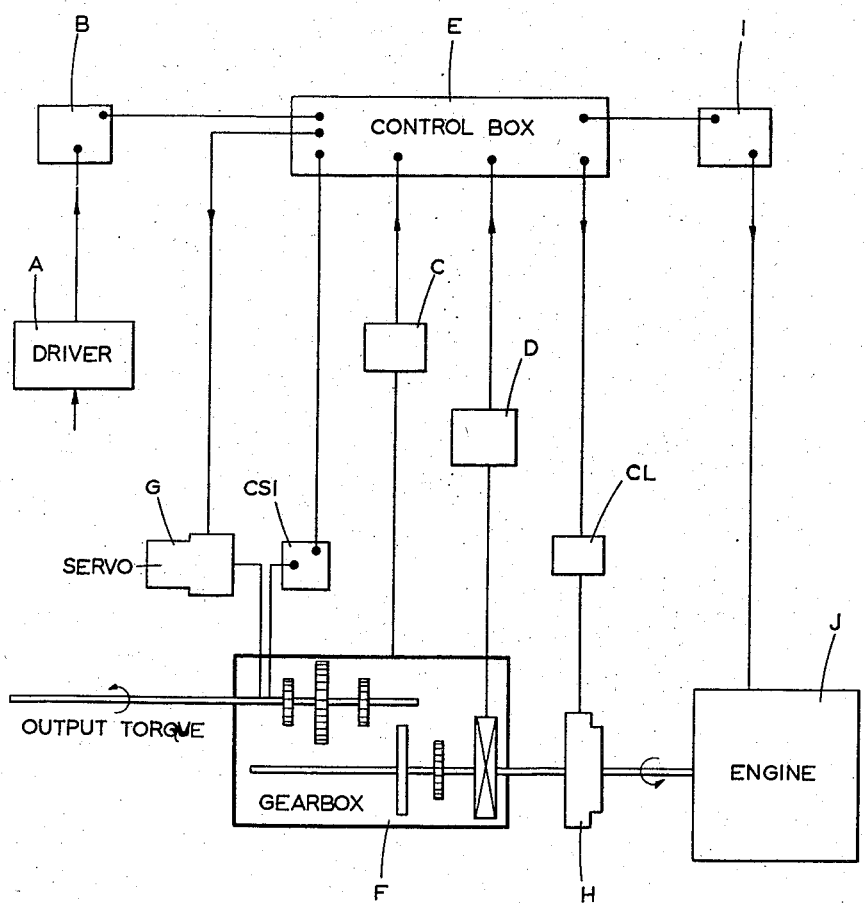

United States Patent Office 2,881,625
Patented Apr. 14, 1959

2,881,625

CONTROL APPARATUS FOR VARIABLE RATIO POWER TRANSMISSION MEANS

Richard Keith Hodkin, Dunstable, England, assignor to Engineering Research and Application Limited, a British company Application July 11, 1957, Serial No. 671,318

Claims priority, application Great Britain July 20, 1956

10 Claims. (Cl. 74—336.5)

This invention relates to control apparatus for the operation of variable ratio power transmission means of the kind having a gear shift member that is required to be moved in two lines of motion which are transverse to each other, e.g. forward left for the 1st gear, rearward left for 2nd gear, forward right for 3rd gear, and rearward right for 4th (top gear or direct drive), said means being associated with an engine driven road vehicle.

The main object of the present invention is to provide means for automatically operating the gear shift member into any of its required positions.

A further object of the invention is to effect disengagement and re-engagement of a clutch operatively disposed between the engine and the primary or input shaft of said transmission means.

According to the present invention the control means comprises servo means (SM) which actuates the shift member in both directions along one line of motion, a gear shift control means (CS) which actuates or controls the movement of the shift member in both directions along the other line of motion; said servo means and control means being electrically controlled each through an electric circuit, a governing means (GV1, GV2) operative at a plurality of different speeds of the input shaft of the transmission means, first switch means (RG/1, RG1) which controls supply of electric current to the servo means and control means, second switch means controlled by said governing means (GV1, RL/4, RL4, RD/3, RD1) for energizing the first switch means when input speed falls below the lower of said speeds, third switch means (GV2) for energizing the first switch means when input speed exceeds the higher of said speeds, fourth switch means (GSA/3, GSA1, RC/4, RC1) operated in accordance with the positions of the shift member for controlling supply of current to part (RD/3) of the second switch means according to whether up or down changes are to be permitted; and fifth switch means (GSC/1, GSC1, RC/4, RC2) operated according to the position of the shift member for passing current to one part (CM) or another part (DM) of the first servo means for actuating the latter in its different directions.

The servo means may comprise a reversible electric motor for moving the shift member along one line of motion and a solenoid and spring which moves the shift member in opposite directions respectively along the other line of motion.

The transmission means will be connected to an engine by means of a clutch which may be of the magnetic particle type.

A constructional form of the invention will now be described by way of example with reference to the accompanying diagrammatic drawings wherein:

Figure 6 is a diagrammatic showing of the control means.

Figure 2:
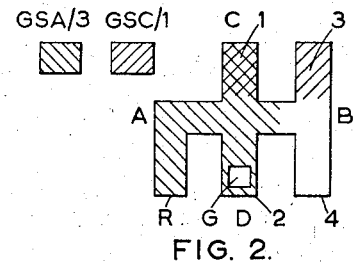
Figure 2 is a diagram of certain switching positions in relation to the positions of the gear shift member of the transmission means.

Figure 2 shows a gate in which a gear shift lever G is required to be moved to reverse, 1st, 2nd, 3rd and 4th gear positions shown respectively at R, 1, 2, 3, 4. This can be accomplished by moving G in opposite directions along a line of motion represented as from A to B and along a transverse line represented as from C to D. The movement A to B is accomplished by gear shift control means comprising a spring (42 in Figure 5) acting on a solenoid CS; from B to A by the solenoid when energized; from D to C by servo means in the form of a reversible motor SM when its field coil CM is energized; and from C to D when its field coil DM is energized.

Figure 5:
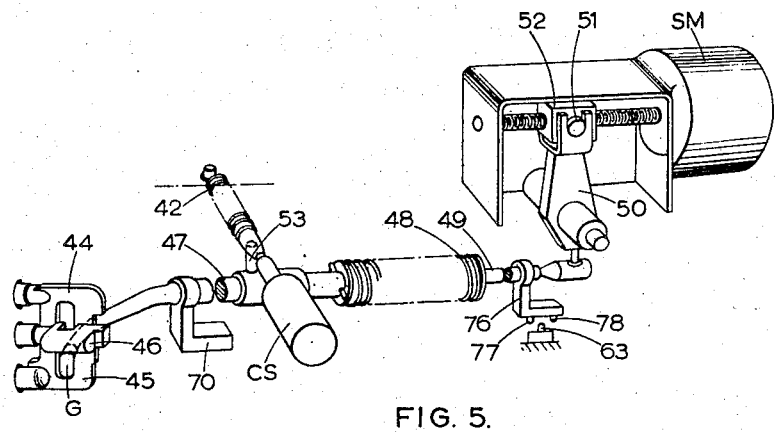
Figure 5 is a perspective view of a gear shift member and associated parts including the servo means controlled by the circuit of Figure 1.

An actual gate is not essential but as shown in Figure 5 the gear shift member G may have similar movements to engage in any one of three forks 44, 45, 46 connected to sliding gears in a gearbox with which the control apparatus is associated. The fork 44 is engaged and moved to either of two positions for 3rd and 4th gears; the fork 46 is engaged and moved to either of two positions for 1st and 2nd gears; and the fork 45 is engaged and moved to a required position for reverse gear.

The shift member is carried by a bar 47 which is moved axially through a spring 48 and rod 49 by a lever 50 that has a forked end engaged by a pin 51 on a nut 52 driven by a screw that is rotated in one direction or the other by the reversible motor SM so as to move the member G backwards or forwards along the line of motion C to D (Figure 2). The motion along A—B is produced by the solenoid CS and spring 42 acting through a universal joint on an arm 53 connected to the bar 47.

Coincidentally with the movements of the gear shift member G, a relay coil GSA/3 is energized in certain of its positions to operate three switches GSA1, GSA2, GSA3 for controlling further action. Also coincidentally with the movements of the member G a relay coil GSC/1 is energized at the "C" end of its stroke to operate a switch GSC1 to control further action. In Figure 2 the coil GSC/1 is energized in all positions of the shift member shown by hatching lines extending from lower left to upper right. The coil GSA/3 is energized in all positions shown by hatching lines extending from upper left to lower right. Thus in leg 1 of the gate both switches are closed.

The motor SM causes a relay coil GSS/3 to be energized during each gear change and this coil actuates switches GSS1, GSS2, GSS3. The motor SM also causes a relay coil GSN/3 to be energized through a spring 48 (Figure 5) during each change and this actuates switches GSN1, GSN2, GSN3, for switching current on and off to a clutch coil CL and switching on and off the ignition circuit during a gear change. The coil CL when energized causes engagement of the vehicle clutch which may be of the magnetic particle type.

Figure 4:
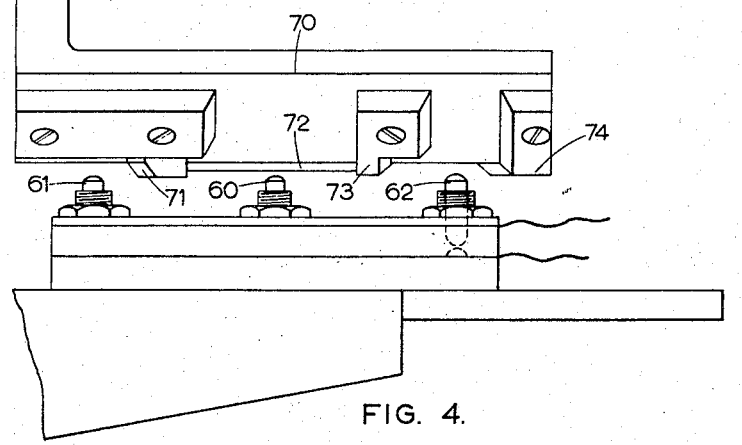
Figure 4 is an elevational view of a switch means for use in the apparatus of Figure 1.

The coils GSS/3, GSA/3, GSN/3 and GSC/1 are energized by closing switches 63, 60, 62, 61 respectively, these switches being urged to their open positions by springs (not shown). The switches are closed by means shown in Figures 4 and 5 wherein a bracket 70 on the bar 47 carries a cam 71 for actuating switch 61, a cam 72 for actuating switch 60, and cams 73 and 74 for actuating switch 62. A similar bracket 76 on the rod 49 carries cams 77, 78 for actuating the switch 63.

Figure 1:
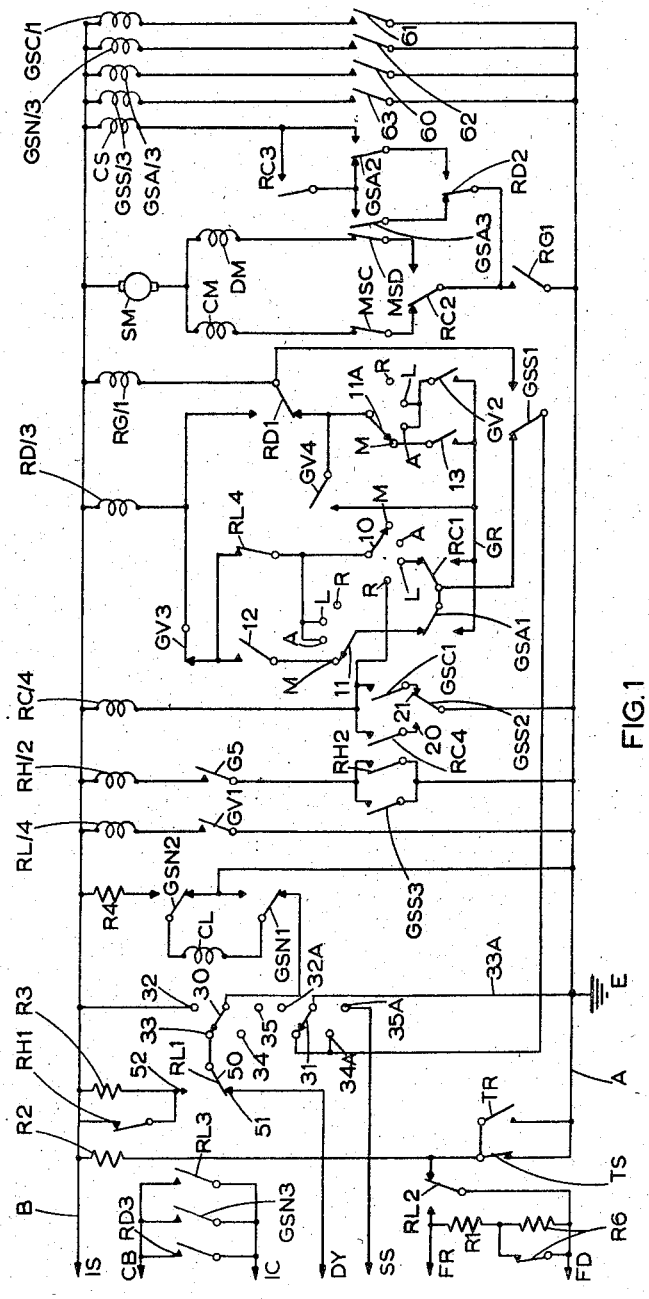
Figure 1 is a circuit diagram of a control apparatus made in accordance with the invention.

In the circuit shown in Figure 1 the lead B is connected to the motor vehicle battery being connected at IS to the usual ignition switch. A lead A is earthed as shown at E.

A lead CB is connected to the engine contact breaker and a lead IC is connected to the ignition coil. CB and IC can be connected to each other or disconnected through one or more of three switches RD3, GSN3, RL3. RD3 is closed during down changes by energizing a relay coil RD/3. The switch GSN3 is operated by switch control GSN/3 to cut the ignition off during up changes but leaving ignition on during down changes. RL3 is operated by relay coil RL/4 to close if the speed of the input shaft of the gearbox falls below a predetermined speed W e.g. 1,000 r.p.m. to prevent stalling of the engine if up changes are required at such low speeds.

A lead DY is connected to the engine dynamo and can be connected by switch RL1 and manual switch 30, and switch GSN1 to the clutch coil CL. The switch RL1 (operated by coil RL/4) disconnects the dynamo from the clutch coil except below a predetermined engine speed and connects the clutch coil to the lead B through a resistance R3 may be shorted out by a switch RH1. The latter is opened by energizing a relay coil RH/2 through an inertia operated switch GS. Thus during down changes RH/2 opens RH1 to bring R3 into the clutch coil circuit to limit the torque which the clutch can transmit and therefore smooth the change. Opening or closing of the switch GS however has no effect unless the switch GSS3 or switch RH2 is closed. Switch GSS3 is closed only during gear change. The switch RH2 is closed by the relay RH/2 so that after GSS3 opens RH2 remains closed and keeps GS in operation until GS opens by its inertia action whereupon RH2 again opens.

The switch 30 is ganged with a switch 31 and these are movable manually to positions 32, 32A but must be held in this position and on release a spring (not shown) moves the switches back to 33, 33A which is the normal driving position. The switches can be moved manually to 34, 34A which is the non-driving position. The switches can also be moved manually to positions 35, 35A for self-starting but on release a spring (not shown) returns the switches to the non-driving positions. 32 connects the clutch coil CL to lead B to hold the apparatus in any gear ratio existing at that time in spite of all controls. 32A and 34 have no connections. 33 provides normal connection to the clutch. 33A and 34A provide an earthing connection for the lead B through other switches and either a down change relay coil RD/3 or a relay coil RG/1 which latter serves to close a switch RG1 that provides an earth connection for the motor and solenoid. 35A connects to the starter solenoid at SS. By moving these switches to one position (35, 35A), the member 31 will complete the self starter circuit of the engine while the member 30 has disconnected the clutch engaging circuit. In another position (as shown), the member 31 will complete a circuit to be described for controlling and effecting gear changes while the member 30 completes the clutch engaging circuit.

FD shows a lead connected to the field coil of the dynamo, FR is a lead connected to the field regulator. A resistance R1 and choke switch CS are connected across FR, FD. Below a minimum predetermined gearbox input shaft speed (speed W) R1 is inserted in the circuit by means of the relay coil RL/4 and switch RL2. When the choke is operated R6 is also inserted. Above speed W a switch RL2 short circuits R1 and R6.

The switch RL2 connects to earth through a switch TS which is closed while the engine throttle is closed thus avoiding energizing of the clutch when the throttle is closed. Switch RL2 can however be earthed through a switch TR actuated by a press button on the handbrake lever so that when the brake is on the button closes the switch to earth the dynamo field; however, the button can be moved manually to engage the clutch in spite of the brake being on when starting uphill.

The clutch is normally energized through RH1 or R3 but during gear change the two clutch switches GSN1 and GSN2 are operated by the shift control GSN/3 to energize the clutch in the opposite direction through a resistance R4 whereby magnetic remanence in the clutch is removed.

The input shaft operates governing means giving control at four different speeds. The governing means closes switch GV1 above speed W of the input shaft of the transmission means, closes switch GV2 above a higher speed, speed W2, opens switch GV3 above a still higher speed W3, and closes switch GV4 above the maximum predetermined speed W4. Switches GV1 and GV2 are used for automatic operation and GV1, GV3, GV4 are used for overriding manual control.

When switch GV1 closes it connects a relay coil RL/4 across B and A whereby it is energized and thereby actuates switches RL1, RL2, RL3, RL4 and produces a change down unless already in 1st or 2nd gear.

Switch RL4 when closed makes a down change possible by providing a path for energizing a relay coil RD/3 through governor controlled switch GV3. When GV3 opens it ensures that a change down cannot be made above speed W3.

Figure 3:
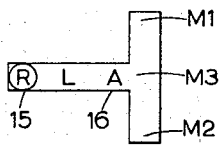
Figure 3 is a diagram of certain switching positions of a manually operable member.

The switch RL4 is also connected to switches 10, 12 and contacts A, L of switch 11. Each switch 10, 11 has contacts M, A, L, Rev, representing "manual," "automatic," "low gear" and "reverse." The switches 10, 11 and another switch 11A are ganged for movement by a common control member. The arrangement is as shown in Figure 3 in which a manually operable control member 15 operates in a gate 16 and in position R gives reverse gear; in position L brings in 1st gear (which otherwise is not used); in position A provides fully automatic control over 2nd, 3rd and top gears and in position M3 change up occurs automatically if speed exceeds W4 or change down occurs automatically if speed falls below W. In position M3 further movements may be made to M1 and M2 release in either position M1, M2, resulting in movement back to M3. In M1 position switch 12 is closed and this will produce gear changes down to 2nd gear, and in M2 position up changes are produced to top gear. These changes M1 and M2 are however overridden by other switches so that:

(1) Momentary move to M1 position gives change down unless in 1st or 2nd gear due to control by switch GSA1.

(2) Momentary move to M2 gives change up unless already in top gear, this being controlled by switches GSA1 and RC1.

(3) By holding member 15 at M1 continuous changes occur to 2nd gear.

(4) By holding member 15 at M2 continuous changes occur to top gear.

(5) No change up can occur in top gear and no change down can occur when in second or bottom gear.

(6) Above speed W4 a change up occurs unless already in top gear.

(7) Above speed W3 no change down can occur.

In the automatic position of the member 15 the switch arm 11 contacts A to connect the relay coil RD/3 to earth (for effecting down changes) through switch GSS1 and one or other of two switches GSA1 and RC1. When switches GSA1 and RC1 are in the positions shown they prevent up changes being made when top gear is engaged. These switches are operated to connect with a lead GR which is connected to switches 13, GV2 and GV4 and in such positions the switches GSA1 and RC1 prevent energizing of RD/3 so that down changes cannot be made when 1st or 2nd gear is engaged. In 3rd gear RC1 has moved down and permits an up change. In 2nd gear RC1 enables down change to be made when control 15 is in the "low gear" position.

A switch 11A is also ganged to switches 10, 11 and has similar positions M, A, L, Rev. In the M position it connects switch 13 with the relay coil RG/1 through switch RD1 when the latter is in the position shown. For down changes the energization of RD/3 moves RD1. Thus in the position shown RD1 permits up changes and in its other position it permits down changes. The positions A, L connect with switch governor GV2.

The relay RD/3 is energized during all down changes and ensures by contacts RD3 that the ignition circuit remains connected during down changes. RD1 transfers the down change signal to RG/1 and the latter is energized during both up and down changes operating RG1 which serves as a current switch to motor SM and solenoid CS.

The relay coil GSS/3 prevents signalling of another change while one change is in progress. Thus it operates a switch GSS1 to disconnect the signals during the change and at this time connects relay RG/1 to earth so as to keep RG/1 energized for operating the motor and if already operated connects coil RD/3 to earth to avoid cancelling of the engine ignition while a gear change is in progress. GSS1 and GSS2 both are arranged to make contact with one contact element before breaking from the other. GSC/1 operates relay RC/4 through GSC1. During gear change GSS2 moves to contact 20 and holds the current in RC/4 if RC4 is closed which in turn holds on switch RC4. At the end of gear change GSC/1 operates switch GSC1, GSS2 returns to contact 21 connected to switch GSC1 and RC4 operates.

When the control member 15 is moved to position R the reverse gear is engaged and this is only possible when switch GV1 is closed, i.e. when the input shaft speed is less than 1,000.

If the control member 15 is moved to the L position the operation is substantially the same as in the A position but a further down change can occur to bottom gear.

When the switch arms 10, 11 and 11A are set to their "A" (automatic) positions only the governors GV1 and GV2 are operative to effect changes of gear. When the switch arms 10, 11 and 11A are set to their "M" (manual) positions only the governors GV1, GV3, GV4, and switch members 12 and 13 are effectively operative.

In the normal operation of the vehicle when starting up, the driver moves a starter lever which depresses both switch arms 30, 31 to operate the starter. The lever automatically returns to the free or neutral position with the arms 30, 31 on the contacts 34, 34A so that the clutch is disengaged. When the driver wishes the vehicle to move forwards he sets the control member 15 to "A" which is the automatic gear changing condition. The transmission gear will then normally be in 2nd gear. He then moves the starter lever to bring the arms 30, 31 on to the contacts 33, 33A so that the clutch is in the dynamo circuit. However at low speeds the current is insufficient to engage the clutch. The driver then removes the brake and depresses the usual accelerator pedal and sufficient current is generated by the dynamo to engage the clutch and the vehicle moves along in 2nd gear. When the transmission input shaft reaches the control speed "A" of governor GV1 (e. g. 1,000 r.p.m.) this governor switch closes and the relay coil RL/4 is energized so as to change switch RL1, in order to place the clutch directly across the battery, change switch RL2 to restore the characteristics of the dynamo, and opens RL3 and RL4 which however has no effect at this moment. When the input shaft reaches the control speed of the governor switch GV2 the latter closes and current flows through the relay coil RG/1 and through switch GSA1 (since this and GSA2, GSA3 are all in positions opposite to those shown in 2nd gear). RG/1 closes switch RG1 and current passes through the motor coil CM and drives the motor to move the gear shift member G towards the "C" side of the shift member position. The solenoid CS is not operated but the spring associated with it moves the shift member towards the "B" side of the shift member position. Accordingly, the shift member moves to 3rd gear position. Meanwhile control GSS/3 will have changed switch GSS1 and thereby continue to energize RG/1 but prevent any other gear changes being signalled and GSN/3 will have switched the clutch and ignition off during the change and on again. The switches GSS/3 and GSN/3 are turned off by springs. At the end of the gear change, GSC/1 is operated and this energizes RC/4 which changes switches RC/1, RC/2, RC/3, RC/4, thereby resetting the circuits for another change. When the gear change has been accomplished the input shaft speed will have fallen and switch governor GV2 will have opened again. When the control speed of GV2 is again reached, GV2 again closes which again energizes RG/1 which again closes RG1 and (since RC2 is now reversed) energizes the motor coil DM which drives the motor to move the gear shift member G towards the D side of the gate. At the same time solenoid CS is again not energized and the spring retains the shift member towards the side B of the gate. The shift member therefore moves to 4th gear and during its movement again operates GSS/3 and GSN/3, and also GSC/1 which releases the switch GSC1.

When the input shaft speed falls below the control speed of governor switch GV1 the latter closes, energizes RL/4 and closes RL4 (as well as operating RL1, RL2, RL3). Since GSA1 is now up (as shown) a circuit is made through RD/3 which reverses RD1 (and RD2 and RD3) and a current passes through RG/1 which closes RG1, and completes the circuit through the motor circuit CM and the motor and the spring of the solenoid return the shift member G to 3rd gear position.

It will be seen that the various relay coils are connected between the battery lead B and the earth by the various switches. Thus GSS/3, GSA/3, GSN/3, GSC/1 are so connected by their switches 63, 60, 62, 61 to earth lead A. The solenoid coil CS can be connected to earth by switches RC3, GSA2, GSA3, RD2, RG1. Either of the motor coils CM, DM are connected by switches MSC, MSD and switches RC2, RG1 to earth. Coil RG/1 can be connected to earth by switch GSS1 and switch 31, and to a lead GR by switches RD1, 11A, 13 or RD1, 11A, GV2, or by RD1, GV4. Switch RD1 can alternatively be connected with coil RD/3. The coil RD/3 can connect to earth through switches GV3, 12, 11, GSA1, assisted when required by RC1 through switches GSS1 and 31. Coil RC/4 can be earthed via switches RC4, GSC1, GSS2. Coil RH/2 can be earthed by switches GS, GSS/3, RH2. Coil RL/4 can be earthed by switch GV1.

The functions of the main coils can be summarized as follows:

(1) The movements of the gear change element controls energization of coils GSA/3, GSC/1, GSN/3.

GSA/3 operates the following switches: GSA1 for selecting up or down change; GSA2 and GSA3 for controlling movement in opposite directions A to B or B to A. GSC/1 operates switch to energize relay coil RC/4. RC/4 operates switches RC1, RC2, RC3, RC4 of which the first two are the most important—RC1 selecting between the up and down change systems and RC2 selecting the direction of operation of the motor.

Switch 62 operates coil GSN/3 which controls switches GSN1, GSN2, GSN3, the first two of which serve for opening and closing the clutch engaging coil CL and the third of which opens the engine ignition circuit while changing gear.

(2) The motor controls energization of coil GSS/3.

Coil GSS/3 operates switches GSS1, GSS2, GSS3 of which GSS1 is the most important and serves for switching off control during gear changing.

(3) Governor controlled switch GV1 energizes coil RL/4 which actuates switches RL1, RL2, RL3, RL4.

(4) Switch GS energizes coil RH/2 which actuates switches RH1, RH2.

(5) Switch RL4 causes coil RD/3 to be energized. Coil RD/3 actuates switches RD1 controlling up and down changes, RD2 controlling current to the solenoid CS, and RD3 for maintaining the ignition circuit on during down gear changing.

(6) Governor controlled switch GV2 energizes coil RG/1 which operates switch RG1 for energizing the motor and solenoid.

For convenience of reference in the appended claims parts of the apparatus are described by the following terms:

First servo means_____ Motor SM.
Second servo means____ Solenoid CS with spring return.
First switch means_____ Coil RG/1, switch RG1.
Second switch means___ First, second and third switches GV1, RL4, RD1 and first and second coils RL/4, RD/3.
Third switch means____ Switch GV2.
Fourth switch means___ Coil GSA/3 and switch GSA1.
Fifth switch means____ Coils GSC/1, RC/4 and switches GSC1, RC1, RC2.
Fourth switch GSA1.
Fifth switch RC1.

If desired, the "low gear" condition may be obtained by a separate switch.

Referring to Figure 6, it shows diagrammatically the following parts:

(A) is a collection of parts operated by the driver viz. the parts of Fig. 1 referenced TS, TR, 30, 31, 10, 11, 11A, 12, 13, FD and giving signals to the control box E which consists of the parts RL/4, RH/2, RC/4, RD/3, RG/1, GSS/3, GSA/3, GSN/3, GSC/1, R1, R2, R3, R4, R6.

(C) is a device (60, 61, 62, 63) giving control signals from the gear box F to the control box E according to gear positions.

(D) is a device (GV1, GV2, GV3, GV4) giving control signals from the gear box (according to output speeds) to the control box.

The control box then gives out the following:

Signals to the servo G (CM, SM, DM) to the gear box input gear change.

Signals to device CSI to the gear box input gear change.

Signals to clutch control device CL to clutch H.

Signals to device I (CB, IC, DY, SS, FR, FD) to control the ignitions and dynamo of the engine J.

In a modified construction, the gear change member moves diagonally from second to third gear and vice versa whereby the solenoid CS and associated switches may be omitted and all movement effected by the motor SM, means being provided for changing the track of the gear change member according to whether it has to be moved transversely or diagonally.

Instead of an electric motor and solenoid, the servo means may comprise pneumatic or hydraulic ram or rams or bellows controlled by electrically operated valves.

Having described my invention, I claim:

1. A control apparatus for a transmission means of the kind referred to comprising a servo means which actuates the shift member in forward and reverse directions along a first line of motion, a gear shift control means which actuates or controls the movement of the shift member in forward and reverse directions along a second line of motion; said servo means and control means being electrically controlled each through an electric circuit, a governing means operative at a plurality of different speeds of the input shaft of the transmission means, first switch means which controls supply of electric current to the servo means and control means, second switch means controlled by said governing means for energizing the first switch means when input speed falls below the lower of said speeds, third switch means for energizing the first switch means when input speed exceeds the higher of said speeds, fourth switch means operated in accordance with the positions of the shift member for controlling supply of current to part of the second switch means according to whether up or down changes are to be permitted; and fifth switch means operated according to the position of the shift member for passing current to one part or another part of the first servo means for actuating the latter in its different directions.

2. An apparatus as claimed in claim 1 wherein the servo means is a reversible electric motor; the second switch means comprises a first switch controlled by the governor means, a first relay coil energized by closing said first switch, a second switch closed by said first relay coil, a second relay coil energized by closing said second switch, and a third switch closed by said second relay.

3. An apparatus as claimed in claim 2 wherein the fourth switch means comprises a fourth switch in circuit with said second relay coil adapted in one position to earth the second relay coil and in another position to energize the first switch means.

4. An apparatus as claimed in claim 2 wherein a fifth switch is connected with the fourth switch and is adapted in one position to energize the first switch means and being itself operated by the fifth switch means.

5. An apparatus as claimed in claim 1 having a switch controlled by the movements of the servo means for cutting off the first switch means from the second switch means during gear change but maintaining the first switch means energized during gear change.

6. An apparatus as claimed in claim 1 having further switch means controlled by the movements of the servo means for opening a clutch engaging electric circuit during gear change so as to open a clutch connected to the transmission means.

7. An apparatus as claimed in claim 1 having means controlled by said servo means for opening the ignition circuit of the engine connected to the transmission means during gear change.

8. An apparatus as claimed in claim 1 having two manually controlled switch members ganged together which in one position has the first member completing a self-starting circuit for an engine connected to the transmission means while the second member breaks a clutch engaging circuit and in another position the first member disconnects from the self-starting circuit and the second member completes the clutch engaging circuit.

9. An apparatus as claimed in claim 8 wherein the first member in said other position completes a gap in the circuit of the second switch means.

10. A control apparatus as claimed in claim 1 wherein the gear shift control means is a spring returned solenoid.

References Cited in the file of this patent

UNITED STATES PATENTS

| | | |
|---|---|---|
| 2,235,943 | Mylius | Mar. 25, 1941 |
| 2,562,366 | Prather | July 31, 1951 |
| 2,605,874 | Price | Aug. 5, 1952 |
| 2,737,059 | Perkins | Mar. 6, 1956 |